United States Patent
Mathew

(10) Patent No.: US 11,003,723 B2
(45) Date of Patent: May 11, 2021

(54) SYSTEM AND METHOD TO ACQUIRE DATA FROM DEEP WEB

(71) Applicant: Marlabs Innovations Private Limited, Bengaluru (IN)

(72) Inventor: Bimodh Jo Mathew, Piscataway, NJ (US)

(73) Assignee: Marlabs Innovations Private Limited, Bangalore (IN)

( * ) Notice: Subject to any disclaimer, the term of this patent is extended or adjusted under 35 U.S.C. 154(b) by 0 days.

(21) Appl. No.: 16/108,340

(22) Filed: Aug. 22, 2018

(65) Prior Publication Data

US 2020/0065419 A1  Feb. 27, 2020

(51) Int. Cl.
*G06F 16/951* (2019.01)
*G06F 9/455* (2018.01)
(Continued)

(52) U.S. Cl.
CPC ........ *G06F 16/951* (2019.01); *G06F 9/45558* (2013.01); *G06F 16/1824* (2019.01); *H04L 12/4641* (2013.01); *G06F 2009/45595* (2013.01)

(58) Field of Classification Search
CPC ............. H04L 12/1831; H04L 65/4015; G06F 16/9024; G06F 16/35; G06F 17/16; G06N 5/04
See application file for complete search history.

(56) References Cited

U.S. PATENT DOCUMENTS

| 9,009,814 B1* | 4/2015 | Wertz ...................... G06F 21/36 726/18 |
| 2002/0049687 A1* | 4/2002 | Helsper ................. H04L 41/147 706/45 |

(Continued)

FOREIGN PATENT DOCUMENTS

| CN | 107808000 A | 11/2017 |
| KR | 101852107 B1 | 11/2017 |

OTHER PUBLICATIONS

How to Access the Deep Web | Complete Guide (https://www.deepwebsiteslinks.com/how-to-access-the-deep-web/ Viewed on May 6, 2018).

(Continued)

*Primary Examiner* — Clayton R Williams
*Assistant Examiner* — Tania M Pena-Santana
(74) *Attorney, Agent, or Firm* — Jason C. Cameron

(57) ABSTRACT

System and method to acquire data from a deep web are provided. The system includes a processing subsystem. The processing subsystem includes a local virtual private network module configured to create at least one first virtual private network within a router. The system also includes a cloud virtual private network (VPN) module configured to create a plurality of second virtual private networks based on the at least one first virtual private network. The plurality of second virtual private networks is configured to enable an access to the deep web. The system also includes a plurality of virtual computing devices configured to access the deep web by one or more crawlers based on one or more parameters and to acquire the data from the deep web based on the one or more parameters. The system also includes a storage device configured to store the data acquired from the deep web.

8 Claims, 3 Drawing Sheets

(51) Int. Cl.
H04L 12/46 (2006.01)
G06F 16/182 (2019.01)

(56) References Cited

U.S. PATENT DOCUMENTS

| | | | | |
|---|---|---|---|---|
| 2005/0125285 A1* | 6/2005 | McQueeney | ........... | G06F 21/10 |
| | | | | 705/14.4 |
| 2006/0101515 A1* | 5/2006 | Amoroso | .......... | H04L 29/12009 |
| | | | | 726/23 |
| 2009/0204610 A1* | 8/2009 | Hellstrom | ............... | G06F 16/00 |
| 2010/0169352 A1* | 7/2010 | Flowers | ................ | G06F 16/951 |
| | | | | 707/759 |
| 2012/0240185 A1* | 9/2012 | Kapoor | ............... | H04L 63/1425 |
| | | | | 726/1 |
| 2015/0128245 A1* | 5/2015 | Brown | .................. | H04L 47/323 |
| | | | | 726/12 |
| 2016/0269353 A1* | 9/2016 | Chan | .................. | H04L 61/2053 |

OTHER PUBLICATIONS

Connect the Dots of Dark Web Activity With Machine Learning (https://www.recordedfuture.com/solutions/dark-web-monitoring/ Viewed on May 6, 2018).

* cited by examiner

SYSTEM AND METHOD TO ACQUIRE DATA FROM DEEP WEB

FIELD OF INVENTION

Embodiments of the present disclosure relate to data acquisition from internet, and more particularly to a system and method to acquire data from a deep web.

With linear growth in the technology, internet has become a source for immense quantities of data, which is used for various purposes by different organizations. One such purpose includes detecting a threat for the organization such as malicious activity or hacking. In general, the data in the internet is classified between surface web and deep web, which includes dark web. It is well known today, that most of the illegal activities or planning for a malicious activity take place in the deep web. Therefore, acquisition and analysis of data from the deep web has become important for the organizations to identify potential threats.

Conventional systems utilized by the organizations for detecting threats are capable of acquiring data from the surface web, which includes data that is accessible by the well-known search engines. However, the conventional systems are unable to acquire data from the deep web as acquisition of data from the deep web requires advanced web crawlers capable of accessing the deep web. Furthermore, additional security protocols are required to be maintained by the system for maintaining anonymity.

In comparison to the conventional systems, newer systems are capable of acquiring data from the deep web as the newer systems employ advanced crawlers and security protocols to acquire the data from the deep web. However, the newer systems are susceptible to breach upon accessing the deep web as the newer systems employ a single layer of anonymity, which if breached enables a hacker to hack the system. Moreover, the newer systems have limited data acquisition capabilities as the newer systems employ one computing device for acquiring data from the deep web.

Hence, there is a need for an improved system and method to acquire data from the deep web to address the aforementioned issues.

BRIEF DESCRIPTION

In accordance with one embodiment of the disclosure, a system to acquire data from a deep web is provided. The system includes a processing subsystem. The processing subsystem includes a local virtual private network (VPN) module. The local virtual private network (VPN) module is configured to create at least one first virtual private network within a router. The system also includes a cloud virtual private network (VPN) module operatively coupled to the local virtual private network (VPN) module. The cloud virtual private network (VPN) module is configured to create a plurality of second virtual private networks. The cloud virtual private network (VPN) module is configured to create a plurality of second virtual private networks based on the at least one first virtual private network. The plurality of second virtual private networks is configured to enable an access to the deep web. The system also includes a plurality of virtual computing devices operatively coupled to the corresponding plurality of second virtual private networks from the at least one first virtual private network. The plurality of virtual computing devices is configured to access the deep web by one or more crawlers based on one or more parameters. The plurality of virtual computing devices is also configured to acquire the data from the deep web based on the one or more parameters. The system also includes a storage device operatively coupled to the plurality of virtual computing devices. The storage module is configured to store the data acquired from the deep web.

In accordance with another embodiment of the present disclosure a method for acquiring data from a deep web is provided. The method includes creating at least one first virtual private network within a router. The method also includes creating a plurality of second virtual private networks from the at least one first virtual private network, wherein the plurality of second virtual private networks enable the access to the deep web. The method also includes accessing the deep web by one or more crawlers based on one or more parameters. The method also includes acquiring the data from the deep web based on one or more constraints. The method also includes storing the data acquired from the deep web.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
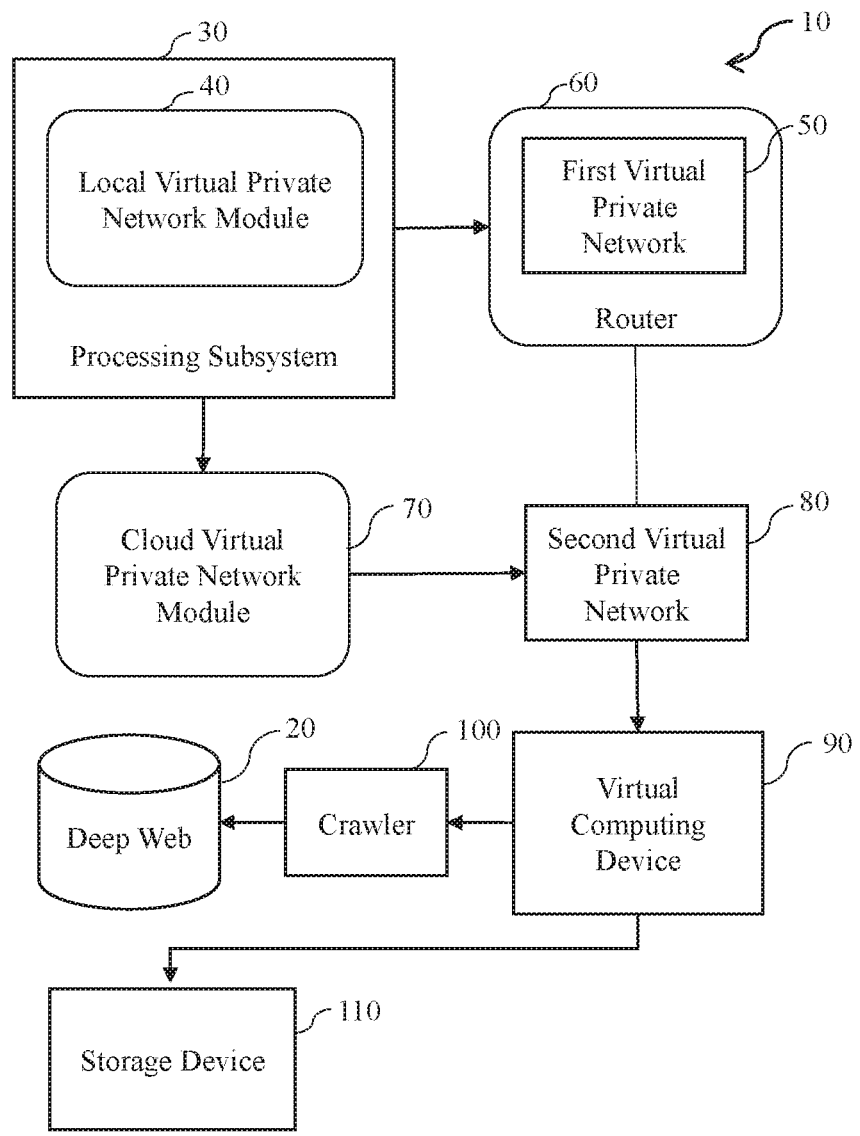
FIG. 1 is a block diagram representation of a system to acquire data from a deep web in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to system and method to acquire data from a deep web. The system includes a processing subsystem. The processing subsystem includes a local virtual private network (VPN) module. The local virtual private network (VPN) module is configured to create at least one first virtual private network within a router. The system also includes a cloud virtual private network (VPN) module operatively coupled to the local virtual private network (VPN) module. The cloud virtual private network (VPN) module is configured to create a plurality of second virtual private networks. The cloud virtual private network (VPN) module is configured to create a plurality of second virtual private networks based on the at least one first virtual private network. The plurality of second virtual private networks is configured to enable an access to the deep web. The system also includes a plurality of virtual computing devices operatively coupled to the corresponding plurality of second virtual private networks from the at least one first virtual private network. The plurality of virtual computing devices is configured to access the deep web by one or more crawlers based on one or more parameters. The plurality of virtual computing devices is also configured to acquire the data from the deep web based on the one or more parameters. The system also includes a storage device operatively coupled to the plurality of virtual computing devices. The storage module is configured to store the data acquired from the deep web.

FIG. 1 is a block diagram representation of a system (10) to acquire data from a deep web (20) in accordance with an embodiment of the present disclosure. As used herein, the term 'deep web' also known as hidden web is defined as a part of the world wide web, wherein content of the deep web (20) is not indexed by a standard search engine. Such deep web (20) is used by people to perform malicious activities such as hacking. Therefore, the present system (10) is employed to acquire data from the deep web (20), which can further be analysed to detect threats such as hacking.

The system (10) includes a processing subsystem (30). The processing subsystem (30) includes a local virtual private network (VPN) module (40). The local VPN module (40) is configured to create at least one first virtual private network (VPN) (50) within a router (60). As used herein, the term 'virtual private network' is defined as a type of private network located across a public network which enables a person to exchange the data across shared or public network in such a way that the person's computing device is directly connected to the private network. Also, the virtual private network is used to access the data from the deep web keeping the access anonymous.

In one exemplary embodiment, the at least one first VPN (50) may use an encryption technique to keep the access anonymous. In such embodiment, the at least one first VPN (50) may mask an internet protocol (IP) address used by the router (60) to initiate the access of the data from the deep web (20). Further, the term 'router' (60) is defined as a networking device which forwards data packets between a plurality of computer networks.

In one embodiment, the at least one first VPN (50) may be created within the router (60) through an interact service provider (ISP) modem. In one exemplary embodiment, the modem may be configured to create the at least one first VPN (50) to initiate an access to the deep web (20), wherein the deep web (20) includes a dark web. As used herein, the term 'dark web' is defined as a part of the world wide web which exists on a darknet which require specific type to browser to access the same.

Furthermore, the system (10) includes a cloud virtual private network (VPN) module (70) operatively coupled to the local virtual private network (VPN) module (40). In one embodiment, the cloud VPN module (70) may be associated to a VPN network which may be created on a cloud platform. The cloud VPN module (70) is configured to create a plurality of second virtual private networks (80). The plurality of second virtual private networks (80) is configured to enable the access to the deep web (20). In one embodiment, the plurality of second VPNs (80) may be created by the cloud VPN module (70) based on the at least one first VPN (50).

The system (10) also includes a plurality of virtual computing devices (90) operatively coupled to the corresponding plurality of second virtual private networks (80) created based on the at least one first virtual private network (50). More specifically, the plurality of second VPNs (80) are communicatively coupled to the corresponding plurality of virtual computing devices (90) through the at least one first VPN (50). As used herein, the 'virtual computing devices' (90) also referred to as virtual machines is defined as an emulation of computer system. The virtual computing device (90) is based on a computer architecture which functions as a physical computer.

Furthermore, the plurality of virtual computing devices (90) is configured to access the deep web (20) by one or more crawlers (100) based on one or more parameters. As used herein, the term 'crawlers' (100) is defined as an internet bot which is used to crawl through the internet to access the data required. In one embodiment, the one or more crawlers (100) may crawl through the deep web (20) to access the data based on the one or more parameters. In one exemplary embodiment, the data from the deep web (20) may be accessed by the one or more crawlers (100) using a web server (not shown in FIG. 1). In such embodiment, the one or more parameters may include at least one a keyword, content of search and a search string which may be used previously to access the deep web (20). In one specific embodiment, the data may be associated with the plurality of illegal activities.

The plurality of virtual computing devices (90) is configured to acquire data from the deep web (20) based on one or more parameters. In one embodiment, the one or more parameters may include metadata which may be pre-defined. In such embodiment, the plurality of virtual computing devices (90) may access the data from the deep web (20) based on the pre-defined metadata. Further, the accessed data is acquired by the plurality of virtual computing devices (90) which may be further be processed for analytical purposes.

Furthermore, the system (10) includes a storage device (110) operatively coupled the plurality of virtual computing devices (90). The storage device (110) is configured to store the data acquired from the deep web (20). In one exemplary embodiment, the storage device (110) may correspond to a network attached storage (NAS). As used herein, the term 'NAS' is defined as a file level computer data storage server which is connected to a computer network for providing data access to the user. Further, NAS may provide data access to heterogeneous group of users. In one exemplary embodiment, the plurality of virtual computing devices (90) may scan through the data of the deep web (20) and analyse the data to be extracted based on the one or more parameters. Further, based on a context of the one or more parameters, the plurality of virtual computing devices (90) may acquire the data associated with the one or more parameters from the deep web (20). In such embodiment, the accessed data may be stored in the storage device (110).

Figure 2:
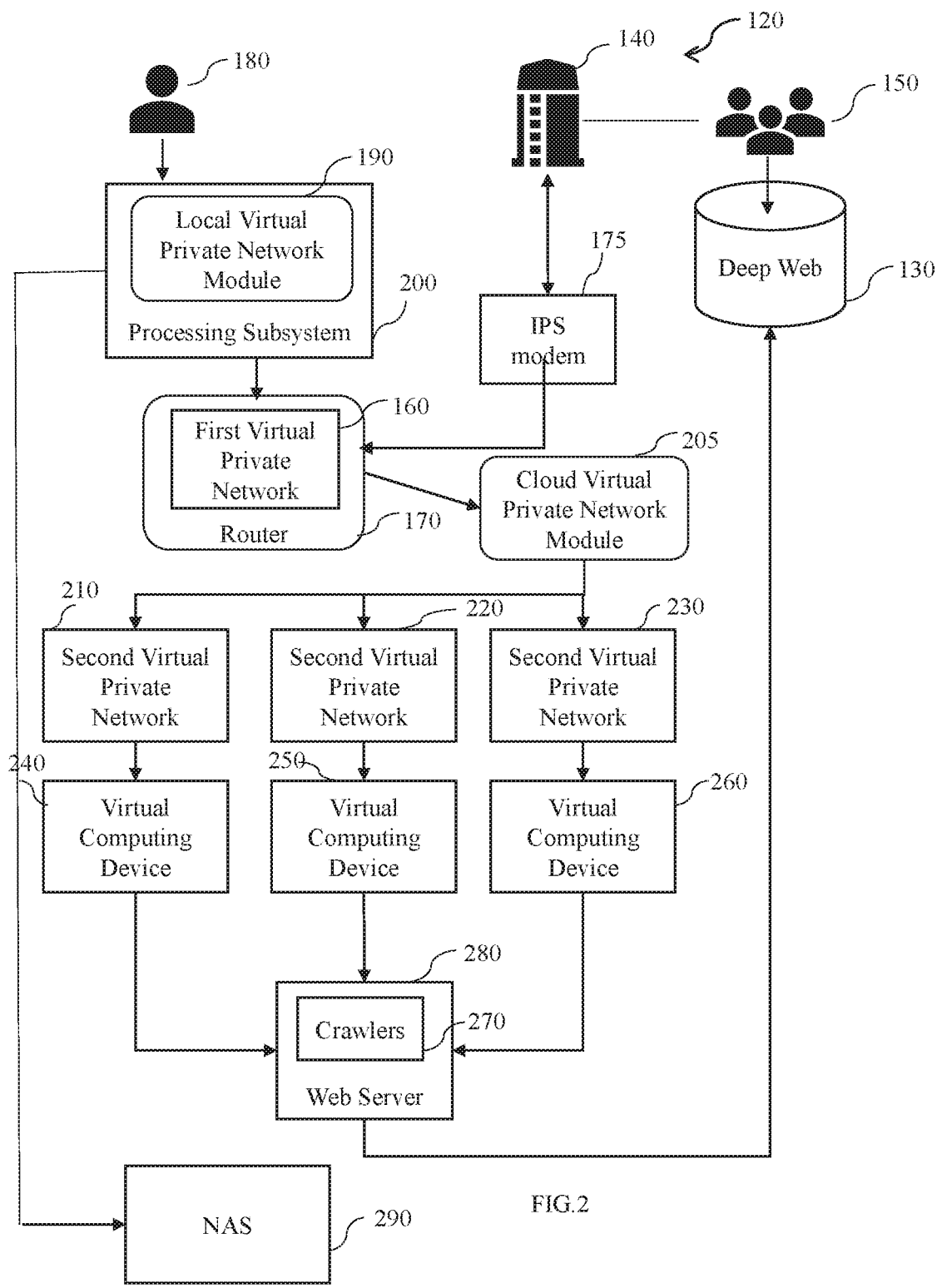
FIG. 2 is a block diagram representation of an exemplary embodiment to acquire data from the deep web associated to hacking a financial department of an organization of FIG. 1 in accordance with an embodiment of the present disclosure.

FIG. 2 is a block diagram representation of an exemplary embodiment a system (120) to acquire data from a deep web (130) associated to hacking a financial department of an organization (140) of FIG. 1 in accordance with an embodiment of the present disclosure. A plurality of employees (150) of the organization (140) may indulge in hacking the financial department of the organization (140). The plurality of employees may initiate the discussion associated to hack the financial department through the deep web (130). The organization (140) associated with the plurality of employees (150) may get a hint about the hacking of the financial department by the plurality of employees (150) and try to extract the data associated with the same. Henceforth, the organization (150) creates a first virtual private network (VPN) (160) on a router (170) which is connected to an internet service provider (IPS) modem (175) associated with the organization (140).

The organization (140) appoints a user (180) to acquire the data associated with the hacking of the financial department of the organization (140) by the plurality of employees. The user (180) creates the first VPN (160) through a local virtual private network (VPN) module (190) through a processing subsystem (200). Furthermore, the user (180) creates three second virtual private networks (210, 220,230) based on the first VPN (160) by a cloud virtual private network (VPN) module (205). The user (180) tries to access the deep web (130) to acquire data by accessing a corresponding three virtual computing devices (240, 250, 260) through which the plurality of employees (150) is planning to hack the financial department of the organization (140). The user (180) tries to access the three virtual computing devices (240, 250, 260) parallelly through the corresponding three second VPNs (210, 220, 220) which will enable the access to the deep web (130), hence making the plurality of employees (150) unaware of the data being extracted which is associated with a hacking plan of the financial department of the organization (140) done by the plurality of employees (150).

Furthermore, the data from the deep web (130) is acquired by the user (180) based on a keyword, content of search and a search string used by the plurality of employees (150) for planning the hacking in the deep web (130) through one or more crawlers (270) from a web server (280). The user (180) also tries to acquire the data from the deep web (130) based on one or more parameters such as a keyword, content of search and a search string used by the plurality of employees (150) in the deep web (130).

Consequently, upon acquiring the data from the deep web (130) associated to the hacking of the financial department, the data is stored in a network attacked storage (NAS) (290) which is operatively coupled to the local VPN module which may be analysed for further study of the acquired data associated to the drug dealing.

Furthermore, the deep web (130), the first VPN (160), the router (170), the local VPN module (190), the processing subsystem (200), the cloud VPN module (205), the three second VPNs (2100, 220, 230), the three virtual computing devices (240, 250, 260), the one or more crawlers (270) and the NAS (290) is substantially similar to a deep web (20), a first VPN (50), a router (60), a local VPN module (40), a processing subsystem (30), a cloud VPN module (70), a plurality of second virtual private networks (80), a plurality of virtual computing devices (90), one or more crawlers (100) and a storage device (110) of FIG. 1 respectively.

Figure 3:
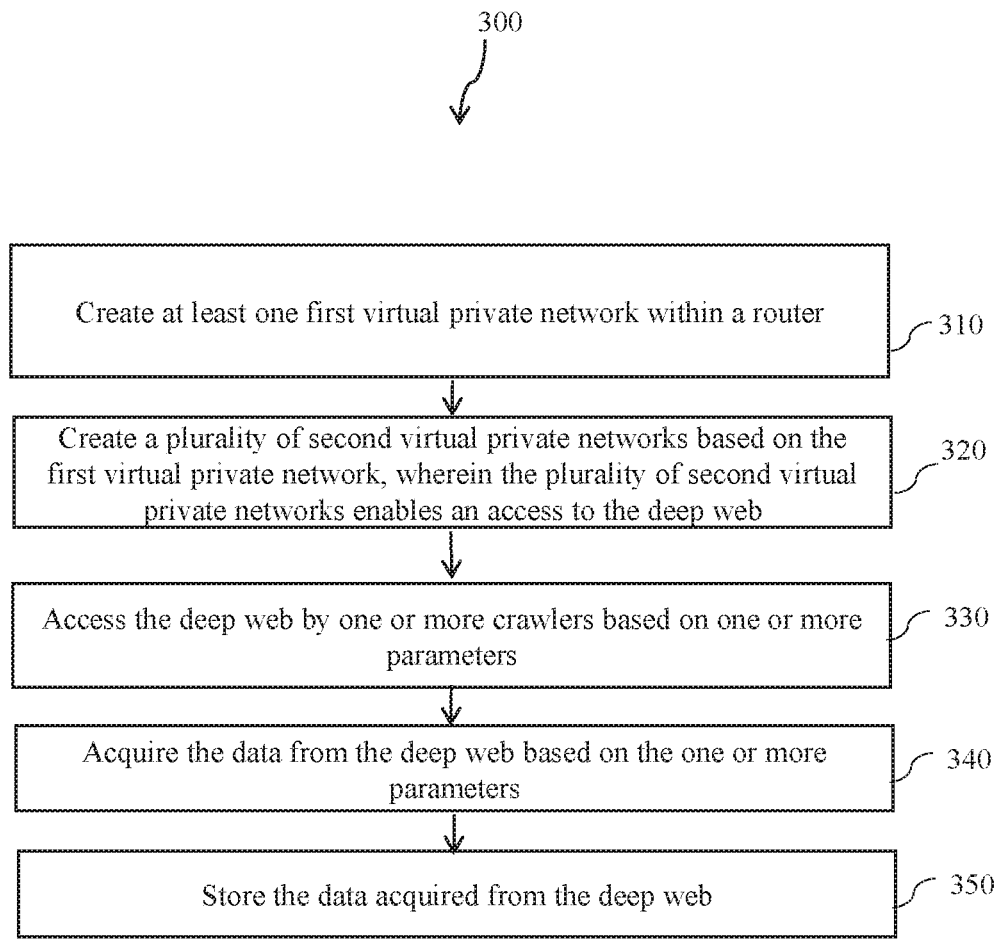
FIG. 3 is a flow chart representing steps involved in a method for acquiring data from a deep web in accordance with an embodiment of the present disclosure.

FIG. 3 is a flow chart representing steps involved in a method (300) for acquiring data from a deep web in accordance with an embodiment of the present disclosure. The method (300) includes creating at least one first virtual private network within a router in step 310. In another embodiment, creating the at least one first virtual private network may include creating the at least one first virtual private network to initiate an access to the deep web including a dark web. In such embodiment, the at least one first VPN may be created by a local virtual private network (VPN) module.

The method (300) also includes creating a plurality of second virtual private networks (VPNs) based on the at least one first virtual private network in step 320. Creating the plurality of second VPNs includes creating the plurality of second to enable the access to the deep web. In one embodiment, creating the plurality of second VPNs may correspond to creating the plurality of second VPNs by a cloud virtual private network (VPN) module which may be operatively coupled to the local VPN module.

Furthermore, the method (300) includes accessing the deep web by one or more crawlers based on one or more parameters in step 330. In one embodiment, accessing the deep web by the one or more crawlers may include accessing the deep web by the one or more crawlers based on at least one of a keyword, a content of search, a search string and a context of search. In another embodiment, accessing the deep web may include accessing the deep web through a web server based on the one or more parameters. In yet another embodiment, accessing the deep web may include accessing the deep web by a plurality of virtual computing devices which may be operatively coupled to the corresponding plurality of second VPNs.

In another embodiment, the method (300) may further include accessing one or more internal sources to enable the access to the data from the one or more internal sources in step 340. In such embodiment, accessing the one or more internal sources may include accessing the at least one of a firewall, a router and a security solution. In one embodiment, accessing the one or more internal sources may include accessing the one or more internal sources by the plurality of virtual computing devices.

The method (300) also includes acquiring the data from the deep web based on the one or more parameters in step 350. In one embodiment, acquiring the data from the deep web may include acquiring the data from the deep web by the plurality of virtual computing devices. In one exemplary embodiment, the method (300) may also include acquiring the data from at least one of the dark web and the surface web. In another exemplary embodiment, the method may further include acquiring the data from the one or more internal sources.

The method (300) also includes storing the data acquired from the deep web in step 350. In one embodiment, storing the data may include storing the data by a storage device. In such embodiment, storing the data by the storage device may include storing the data on a network attached storage (NAS). In one exemplary embodiment, storing the data may include storing the data acquired from at least one of the one or more internal sources and the one or more of external sources. In one exemplary embodiment, the method may include analysing the acquired data for further detection of threat.

Various embodiments of the system and method to acquire data from the deep web enable the system to improve the anonymity of the system as a plurality of VPNs are created on top of the first VPN, thereby creating a multilayer of anonymity to access the data from the deep web. Hence, if the second VPN is compromised, the first VPN maintains the anonymity of the system.

Also, as the system employs the plurality of computing devices to access the data from the deep web, the data is parallelly accessed by the plurality of computing devices hence increasing the volume of data that can be acquired from the deep web.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system to acquire data from a deep web comprising:
   a processing subsystem comprising a local virtual private network (VPN) module configured to create at least one first VPN within a router, wherein the VPN comprises a type of private network located across a public network which enables a user to exchange data across at least one of a shared network and a public network in such a way that the user's computing device is directly connected to the private network;
   a cloud VPN module coupled to the local VPN module via the first VPN, and configured to create a plurality of second VPNs on a cloud platform based on the at least one first VPN, wherein the plurality of second VPNs are configured to enable access to the deep web, wherein the deep web comprises a part of a world wide web which exists on a darknet which requires a specific type of browser to access data, wherein the plurality of VPNs are created on top of the first VPN in the cloud platform, thereby creating a multilayer of anonymity to access the data from the deep web;
   a plurality of virtual computing devices coupled to the corresponding plurality of second VPNs, and configured to:
      access the deep web by one or more crawlers based on one or more parameters; and
      acquire data from the deep web based on the one or more parameters; and
   a storage device coupled the plurality of virtual computing devices and configured to store data acquired from the deep web, wherein at least one of the plurality of virtual computing devices analyzes data acquired from the deep web to detect threats.

2. The system of claim 1, wherein the one or more parameters comprises at least one a keyword, content of search and a search string.

3. The system of claim 1, wherein the storage device comprises a network attached storage (NAS).

4. The system of claim 1, wherein the storage device is further configured to store data acquired from the one or more internal sources, wherein data from one or more internal sources comprises data from at least one of a dark web and a surface web.

5. A method for acquiring data from a deep web comprising:
   creating, by a local virtual private network (VPN) module, at least one first VPN within a router;
   creating, by a cloud VPN module, a plurality of second VPNs on a cloud platform from the at least one first VPN, wherein the plurality of second VPNs enables an access to the deep web, wherein the plurality of VPNs are created on top of the first VPN in the cloud platform, thereby creating a multilayer of anonymity to access the data from the deep web;
   accessing, by a plurality of virtual computing devices, the deep web by one or more crawlers based on one or more parameters;
   acquiring, by the plurality of virtual computing devices, data from the deep web based on the one or more parameters;
   storing, by a storage device, data acquired from the deep web; and
   analyzing, by at least one of the plurality of virtual computing devices, data acquired from the deep web to detect threats.

6. The method of claim 5, wherein accessing the deep web by the one or more crawlers based on the one or more parameters comprises accessing the deep web by one or more crawlers is based on at least one of a keyword, a content of search, a search string, and a context of search.

7. The method of claim 5, further comprising acquiring, by the plurality of virtual computing devices, data from one or more internal sources, wherein the one or more internal sources comprises at least one of a firewall, a router, and a security solution.

8. The method of claim 7, further comprising storing, by the storage device, data acquired from one or more internal sources.

* * * * *